United States Patent
Park et al.

(10) Patent No.: US 7,706,653 B2
(45) Date of Patent: Apr. 27, 2010

(54) OPTICAL WAVEGUIDE DEVICE

(75) Inventors: Suntak Park, Daejeon (KR); Seok Ho Song, Seoul (KR); Hyong Sik Won, Gyeonggi-do (KR); Myung-Hyun Lee, Daejeon (KR); Jung Jin Ju, Daejeon (KR); Min-Su Kim, Daejeon (KR); Jin Tae Kim, Daejeon (KR); Seung Koo Park, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 11/857,262

(22) Filed: Sep. 18, 2007

(65) Prior Publication Data

US 2008/0080824 A1    Apr. 3, 2008

(30) Foreign Application Priority Data

Sep. 29, 2006   (KR) ............... 10-2006-0096324

(51) Int. Cl.
    *G02B 6/10* (2006.01)
(52) U.S. Cl. ..................................... 385/131; 385/130
(58) Field of Classification Search .......... 385/129–132
    See application file for complete search history.

(56) References Cited

U.S. PATENT DOCUMENTS

| | | | |
|---|---|---|---|
| 5,729,641 A * | 3/1998 | Chandonnet et al. ........... 385/2 |
| 6,442,321 B1 | 8/2002 | Berini et al. |
| 6,614,960 B2 | 9/2003 | Berini et al. |
| 6,741,782 B2 | 5/2004 | Berini |
| 6,801,691 B2 * | 10/2004 | Berini .......................... 385/39 |
| 6,823,111 B2 | 11/2004 | Jette et al. |
| 6,914,999 B2 | 7/2005 | Breukelaar et al. |
| 7,010,183 B2 * | 3/2006 | Estes et al. .................... 385/14 |
| 7,026,701 B2 | 4/2006 | Scales et al. |
| 7,043,134 B2 | 5/2006 | Berini et al. |

(Continued)

FOREIGN PATENT DOCUMENTS

JP    2004-109965    4/2004

(Continued)

*Primary Examiner*—Uyen-Chau N Le
*Assistant Examiner*—John M Bedtelyon
(74) *Attorney, Agent, or Firm*—Rabin & Berdo, P.C.

(57) ABSTRACT

Provided is an optical waveguide device including: a core having a stacked structure of at least three layers in which first thin films having a finite width and thickness and formed of a material having a relatively high electric conductivity and a second thin film having the same width as the first thin films and formed of a material having a lower conductivity than the material forming the first thin films are stacked in sequence, the first thin films being disposed in a first layer and an uppermost layer and adjacent to each other for interaction of surface plasmons; and a clad disposed around the core and formed of a material having a lower conductivity than the material forming the first thin films and a higher refractive index than the material forming the second thin film. The thin metal films of at least two layers having a high electric conductivity in the optical waveguide device can generate a combined surface plasmon mode and propagate the generated surface plasmon mode in the length direction of the thin metal films. Thus, a propagated signal suffers from a smaller propagation loss than a surface plasmon mode supported by a single thin film.

20 Claims, 8 Drawing Sheets

U.S. PATENT DOCUMENTS

| | | |
|---|---|---|
| 7,236,332 B2 * 6/2007 | Stipe | 360/317 |
| 7,312,445 B2 * 12/2007 | Lapchuk et al. | 250/306 |
| 7,583,882 B2 * 9/2009 | Guo | 385/131 |
| 2004/0062503 A1 4/2004 | Challener | |
| 2005/0232544 A1 10/2005 | Blumberg | |
| 2006/0076474 A1 4/2006 | Lapchuk et al. | |

FOREIGN PATENT DOCUMENTS

| | | |
|---|---|---|
| KR | 2004-0019124 | 3/2004 |
| KR | 2005-0056137 | 6/2005 |
| KR | 2006-0044783 | 5/2006 |

* cited by examiner

OPTICAL WAVEGUIDE DEVICE

CROSS-REFERENCE TO RELATED APPLICATION

This application claims priority to and the benefit of Korean Patent Application No. 2006-96324, filed Sep. 29, 2006, the disclosure of which is incorporated herein by reference in its entirety.

BACKGROUND

1. Field of the Invention

The present invention relates to optical device technology, and more particularly, to a low-loss metal optical waveguide device based on surface plasmons.

2. Discussion of Related Art

A surface plasmon is an oscillating wave of charge density propagating along an interface at which the real number portion of a dielectric constant changes with an opposite sign. In general, a surface plasmon is generated in the interface between a metal having a negative (−) polarity and a dielectric having a positive (+) polarity, and the charge density oscillation may be excited by highly accelerated electrons or light waves. A surface plasmon is a transverse magnetic (TM) polarized wave, and a field having the largest value at a metal surface exponentially decreases with the increase of distance from the metal. Due to this characteristic, a surface plasmon has been frequently used to measure the characteristics of material existing in a metal surface and the optical constant of the metal. In addition, since the field is concentrated near the metal surface, a surface plasmon has many advantages for application in a sensor, etc. Furthermore, a surface plasmon reacts sensitively to the perturbation of a metal surface and thus has application to optical devices using the sensitivity.

In optical waveguides, a surface plasmon obtains a binding condition by a boundary condition between a metal and a dielectric, thus having a drawback in that the propagation length of light is very short, i.e., several tens or hundreds of micrometers (μm), in the visible ray or infrared region. However, when a metal structure is formed into a thin film, the propagation length of a surface plasmon bound in an interface between the metal and the dielectric can be infinitely increased, in theory, using a super mode activated by the interference between surface plasmons propagating along the two interfaces of a thin metal film. Such a long-range surface plasmon was suggested in the early 1980s, and much research on the same has been in progress.

According to a long-range surface plasmon structure in an infinite metal plate, the application of an optical device is possible using optical transmission or field increase. However, a long-range surface plasmon is bound in two dimensions and thus is limited in applicability to an integrated optical device. For this reason, much research has been in progress, which binds a long-range surface plasmon propagating along a metal plate in a direction parallel with the metal surface to be used in integrated optical devices. A surface plasmon is bound in a surface direction by forming a dielectric structure on a metal surface or forming the metal into a structure having a finite cross section. Lately, research on a long-range surface plasmon using a thin metal film having a finite area, i.e., a metal stripe, has been progressing energetically, and also, metal stripe devices have been reported as being produced.

When a metal stripe having a uniform thickness of 10 nm or less is fabricated, a conventional metal stripe optical waveguide using a long-range surface plasmon can theoretically have a propagation loss of 1 dB/cm or less at the communication wavelength of 1.55 μm. However, since there is a limit to fabrication of a uniform metal stripe, realistically it is impossible or very difficult to implement a low-loss waveguide, thereby limiting applicability for various devices.

SUMMARY OF THE INVENTION

The present invention is directed to an optical waveguide device capable of minimizing the strength of a surface plasmon mode in a thin metal film by disposing at least two thin metal films adjacent to each other to interact with each other and forming a dielectric thin film having a low refractive index between the thin metal films according to a technique minimizing the loss of a metal-stripe optical waveguide on the basis of a long-range surface plasmon, unlike a conventional method using a single thin metal film or a single metal stripe having a finite width as an optical waveguide.

One aspect of the present invention provides an optical waveguide device comprising: a core having a stacked structure of at least three layers in which first thin films having a finite width and thickness and formed of a material having a relatively high electric conductivity and a second thin film having the same width as the first thin films and formed of a material having a lower conductivity than the material forming the first thin films are stacked in sequence, the first thin films being disposed in a first layer and an uppermost layer and adjacent to each other for interaction of surface plasmons; and a clad disposed around the core and formed of a material having a lower conductivity than the material forming the first thin films and a higher refractive index than the material forming the second thin film.

Another aspect of the present invention provides an optical waveguide device comprising: a core having a stacked structure of at least three layers in which first thin films having a finite width and thickness and formed of a material having a relatively high electric conductivity and a second thin film having a larger or smaller width than the first thin films and formed of a material having a lower conductivity than the material forming the first thin films are stacked in sequence, the first thin films being disposed in a first layer and an uppermost layer and adjacent to each other for interaction of surface plasmons; and a clad disposed around the core and formed of a material having a lower conductivity than the material forming the first thin films and a higher refractive index than the material forming the second thin film.

Yet another aspect of the present invention provides an optical waveguide device comprising: a core comprising a cylinder having a finite diameter for the interaction of surface plasmons and a finite thickness, formed of a material having a relatively high electric conductivity, and filled with a material having a lower electric conductivity than the material forming the cylinder; and a clad disposed around the core and formed of a material having a lower conductivity than the material forming the cylinder and a higher refractive index than the material filling the cylinder.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1A:
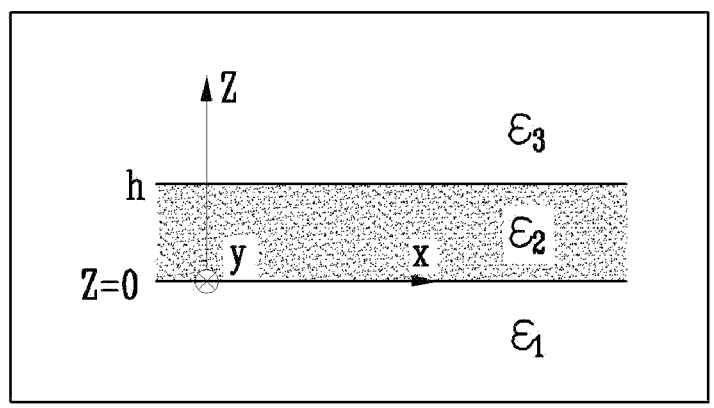
FIGS. 1A to 1C illustrate an electric field of surface plasmons according to electric charge distribution in a thin metal film having a finite thickness.
Figure 1B:
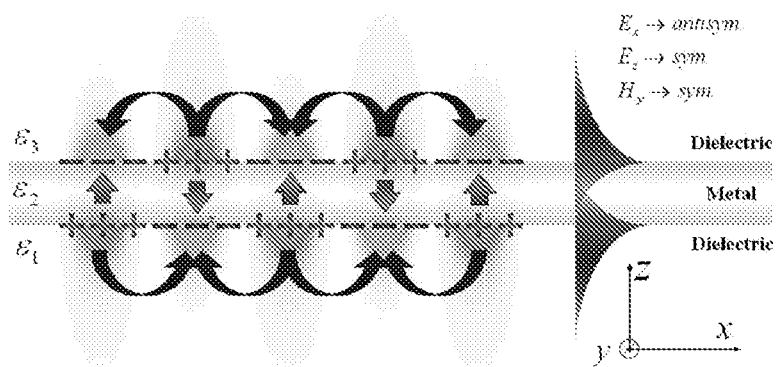
Figure 1C:
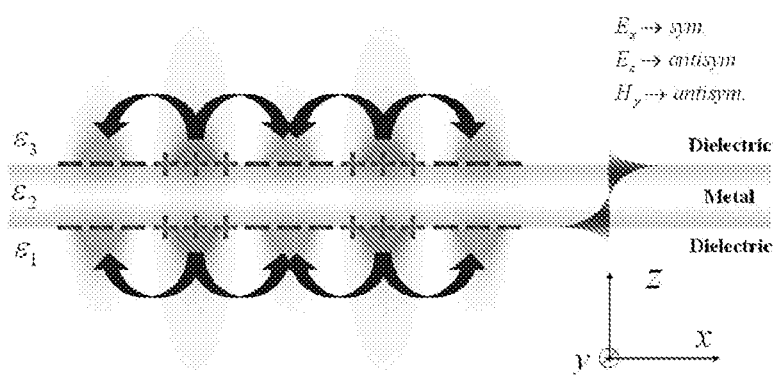

FIGS. 1A to 1C illustrate an electric field of surface plasmons according to electric charge distribution in a thin metal film having a finite thickness.

As illustrated in FIG. 1A, surface plasmons propagate along the interfaces between an infinite metal and dielectrics. When the thickness of the metal becomes finite, surface plasmons existing in the upper part and the lower part of the metal have an effect on each other. In other words, in FIG. 1A, when a thickness h of the metal is infinite, surface plasmons separately propagating along each interfaces at $z=+\infty$ and $z=-\infty$ exist. Here, the frequency characteristics of each surface plasmon depend on the dielectric constant of a dielectric at each interface, thus having a dispersion relation according to the following formula:

$$k_x = \frac{\omega}{c}\sqrt{\frac{\varepsilon_1 \cdot \varepsilon_2}{(\varepsilon_1 + \varepsilon_2)}}.$$ [Formula 1]

With the decrease of the metal thickness h, the surface plasmons that have existed separately have an effect on each other. When the metal thickness h has a smaller value than the surface plasmons' penetration depth into the metal, the surface plasmons existing at both interfaces are combined and form a super mode. The super mode, which is referred to as a fano mode, has a dispersion relation depending on the thickness of a metal as well as the optical constants of the metal and a dielectric.

When the surface plasmons are excited in the thin metal film, a relation between electric charges and electric fields may be expressed as shown in FIGS. 1B and 1C, and the super mode combined in the thin metal film is classified into a symmetric mode and an anti-symmetric mode according to electric field distribution in the metal. Referring to FIGS. 1B and 1C, the characteristics of an electric field according to a kind of the super mode can be intuitionally recognized. The super mode is expressed as symmetric bound $s_b$ and anti-symmetric bound $a_b$, the subscript b showing the binding characteristics of the modes distinguished from a leaky mode. Assuming that the propagation direction of surface plasmons is the x-axis in FIG. 1A, a super mode in which electric fields perpendicular to the metal surface do not have a value of 0 as shown in FIG. 1B is referred to as the symmetric mode, and a super mode in which electric fields perpendicular to the metal surface have a value of 0 as shown in FIG. 1C is referred to as the anti-symmetric mode. Here, the signal of the electric field is not changed in the metal according to the symmetric mode but is changed according to the anti-symmetric mode. In order to consider the propagation characteristics of surface plasmons in a thin film structure, it is convenient to classify the thin film structure into a symmetric structure or an anti-symmetric structure according to the distribution of dielectrics up and down a metal surface. This is because a bound mode always exists in the symmetric structure regardless of the thickness of the metal but cutoff of the bound mode exists in the anti-symmetric structure according to the thickness of the metal and difference between the permittivities of the dielectrics. Surface plasmons propagating in a symmetric structure have the following remarkable characteristics: a bound mode always exists; and the propagation length of surface plasmons existing in an infinite metal is limited by the unique optical loss of the metal, but when the metal thickness becomes thin, long-range propagation is possible. When the metal thickness is thin and the dielectric constants of adjacent dielectrics are small, the $s_b$ mode existing in the symmetric structure can perform long range propagation of light and thus is also referred to as long-range surface plasmon mode. In addition, when the metal thickness is 10 nm or less, the propagation loss of 1 dB/cm may be obtained in a communication wavelength region.

However, since light waves are bound in two dimensions only, the above mentioned thin metal film has a structural limit in its applicability to an integrated optical device. Thus, the binding condition of surface plasmons in metal needs to include three dimensions. When the area of the thin metal film is limited as a dielectric optical waveguide, the binding condition of surface plasmons can be applied in the left and right directions of the thin metal film as well as the up and down directions. With respect to a long-range surface plasmon in a metal stripe waveguide (MSW) having a finite width, the binding characteristics of a mode have been theoretically analyzed by Berini in 1999 and proved by an experiment in 2000.

However, reducing the thickness of a metal stripe to 10 nm or less is technically limited. According to a report by M. Yano et al., when the thickness of a thin metal film is 10 nm or less, it is possible to check that the dielectric constant of the metal is different from that of a bulk metal. In addition, as indicated by T. Nikolajsen et al., when the thickness of a thin metal film is reduced, the increasing resistance of the metal limits a propagation length. Thus, increasing a propagation length by only reducing a metal thickness has its limit. As described above, the propagation length of surface plasmons can be increased by reducing the line width of a metal stripe, but the effect is feeble. Furthermore, high-priced equipment is required to fabricate a metal stripe having a line width of 1 μm or less.

In order to solve the above mentioned problems, the present invention suggests a device capable of increasing the propagation length of a long-range surface plasmon using the structure of a thin metal film having several layers and a finite width, i.e., the structure of metal stripes and a dielectric thin film. By disposing double metal stripes adjacent to each other and interposing a dielectric having a lower refractive index than other parts around the double metal stripes, the propagation length of long-range surface plasmons can increase approximately 10 times more than that of an optical waveguide comprising a single metal stripe. The propagation length of long-range surface plasmons increases because the amount of a field bound in the metal is reduced in comparison with the simple symmetric structure. Much of a field of surface plasmons spreads to the dielectric by adjusting the effective refractive index of surface plasmons to be similar to the refractive index of an adjacent dielectric, and most of a field is controlled to exist in the dielectric having a high refractive index, so that the amount of the field bound in the metal can be reduced.

Figure 2:
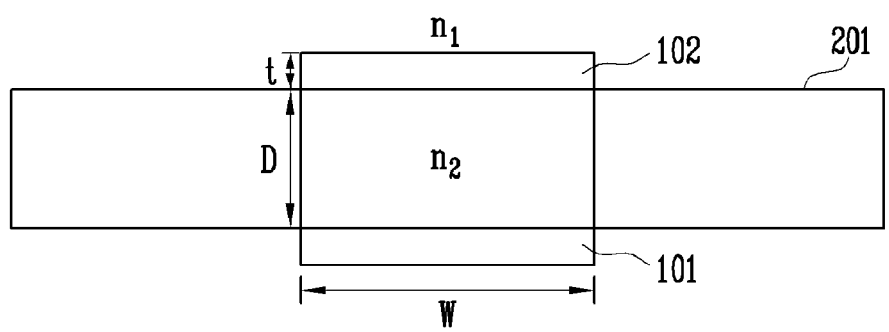
FIG. 2 is a block diagram illustrating an optical waveguide structure composed of double metal stripes for long-range surface plasmon propagation according to an exemplary embodiment of the present invention.

FIG. 2 is a block diagram illustrating an optical waveguide structure comprising double metal stripes for long-range surface plasmon propagation according to an exemplary embodiment of the present invention.

The optical waveguide structure of the exemplary embodiment is fabricated on the basis of the base structure suggested in the present invention. Referring to FIG. 2, the optical waveguide structure of this exemplary embodiment is fabricated such that double metal stripes 101 and 102 having a finite width w and a finite thickness t are disposed apart from each other by a predetermined distance D, and a dielectric layer 201 having a lower dielectric constant $n_2$ than a dielectric constant $n_1$ of a dielectric around the double metal stripes 101 and 102 is interposed between the double metal stripes 101 and 102. In the following description, the double metal stripes 101 and 102 may be referred to as first thin films 101, and the dielectric layer 201 between the double metal stripes 101 and 102 may be referred to as a second thin film 102.

Figure 3A:
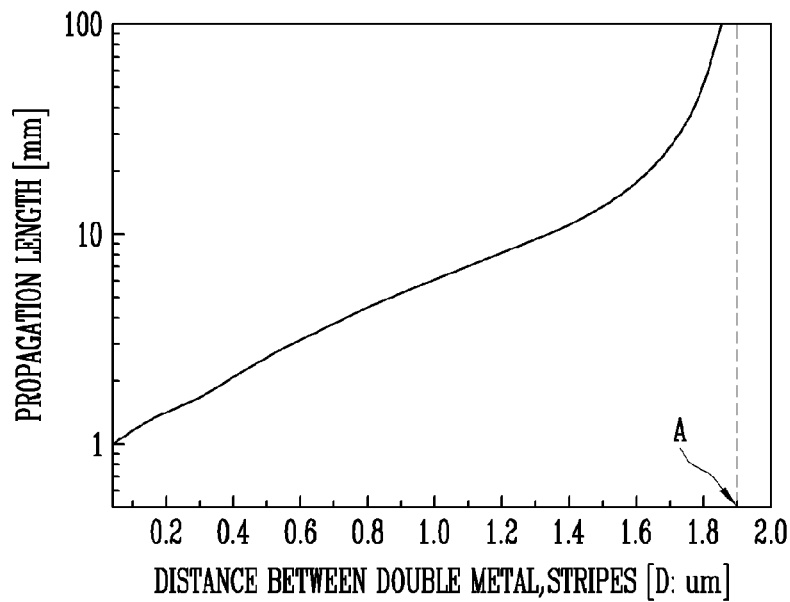
FIG. 3A is a graph showing the distribution curve of a propagation length according to a distance between double metal stripes of FIG. 2.
Figure 3B:
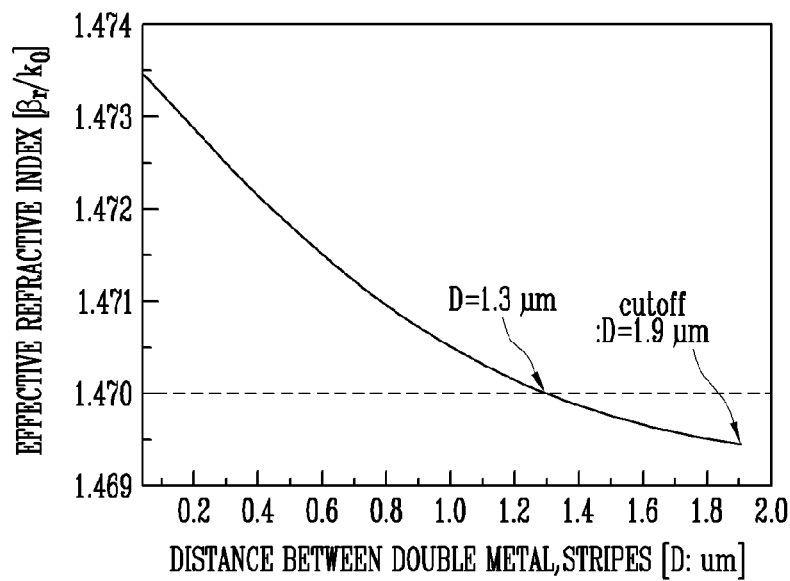
FIG. 3B is a graph showing the distribution curve of an effective refractive index according to a distance between double metal stripes of FIG. 2.

A propagation length and an effective refractive index calculated while changing the distance D between the double metal stripes 101 and 102 from 0 to 2.0 μm are shown in FIGS. 3A and 3B. The metal stripes 101 and 102 used for the calculation are formed of gold (Au) and have a width of 5 μm and a thickness of 20 nm. The dielectric constant $n_1$ of the dielectric around the metal stripes is 1.47, and the dielectric constant $n_2$ of the dielectric layer 201 between the double metal stripes 101 and 102 is 1.46. As shown in FIGS. 3A and 3B, with the increase of the distance between the double metal stripes 101 and 102, the propagation length increases and the effective refractive index decreases. This is because the effective refractive index of a mode is reduced by a surface plasmon field existing in the region of the dielectric 201 between the double metal stripes 101 and 102 having the smaller dielectric constant $n_2$ than the dielectric constant $n_1$ of the dielectric around the metal stripes 101 and 102, and thus much of the surface plasmon field spreads to dielectric regions around the metal stripes. The maximum propagation length according to a distance between the double metal stripes 101 and 102, i.e., the separation distance D, is 208 mm at D=1.9 μm (A in FIG. 3A), which is about 10 times that of a single metal stripe.

Referring to FIG. 3B, just in a region in which the separation distance D is larger than 1.3 μm, the effective refractive index becomes smaller than the dielectric constant $n_1$ of the dielectric around the metal stripes due to the influence of the dielectric layer 201, thus becoming the leaky mode. In addition, in FIG. 3A, since a mode is widely distributed up and down the metal stripes, the shape of mode distribution becomes anti-symmetric. When D=1.3 μm, at which a mode begins to converge, the propagation length is about 9 mm, which is smaller rather than larger than the propagation length of a single metal stripe. Therefore, the optical waveguide structure as shown in FIG. 2 can be used in some devices but is not suitable for long range propagation of light in an optical device.

Figure 4A:
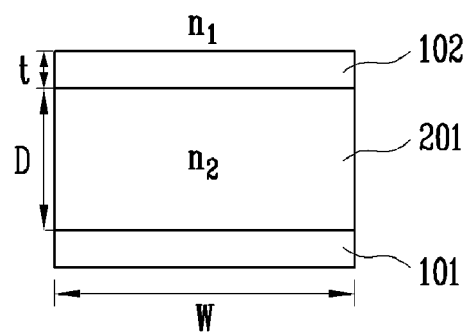
FIG. 4A is a cross-sectional view of an optical waveguide structure composed of double metal stripes for long-range surface plasmon propagation according to an exemplary embodiment of the present invention.
Figure 4B:
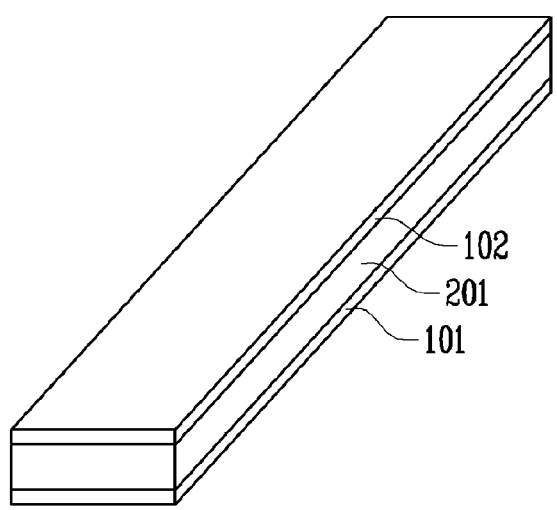
FIG. 4B is a perspective view of an optical waveguide having the optical waveguide structure of FIG. 4A.

FIG. 4A is a cross-sectional view of an optical waveguide structure comprising double metal stripes for long-range surface plasmon propagation according to another exemplary embodiment of the present invention. FIG. 4B is a cross-sectional perspective view of an optical waveguide having the optical waveguide structure of FIG. 4A.

In the optical waveguide structure described with reference to FIG. 2, field distribution is anti-symmetric between the upper part and the lower part of the metal stripes and between the left part and the right part. This is because the effective refractive index of the super mode is a similar or smaller value to/than the dielectric constant $n_1$ of the dielectric around the metal stripes and a larger value than the dielectric constant $n_2$ of the dielectric layer between the double metal stripes, and thus the surface plasmon mode is firmly bound in the dielectric layer region between the double metal stripes and is weakly bound in the dielectric regions around the metal stripes. When the dielectric layer region is just limited between the double metal stripes as shown in FIGS. 4A and 4B, the problem of anti-symmetry of a mode can be solved.

The problem of the anti-symmetry of a mode can be solved using the optical waveguide structure shown in FIGS. 4A and 4B because when the region of the dielectric layer 201 having a small refractive index exists between the double metal stripes 101 and 102 only, and an effective refractive index is determined from the viewpoint of the super mode, the decrements of the field become identical between the left part and the right part of the double metal stripes 101 and 102 and between the upper part and lower part. Therefore, when the width w and the thickness t of the double metal stripes 101 and 102 and the distance D between the double metal stripes 101 and 102 are adjusted, it is possible to form an optical waveguide comprising double metal stripes having the same effect as a single metal stripe.

Figure 5A:
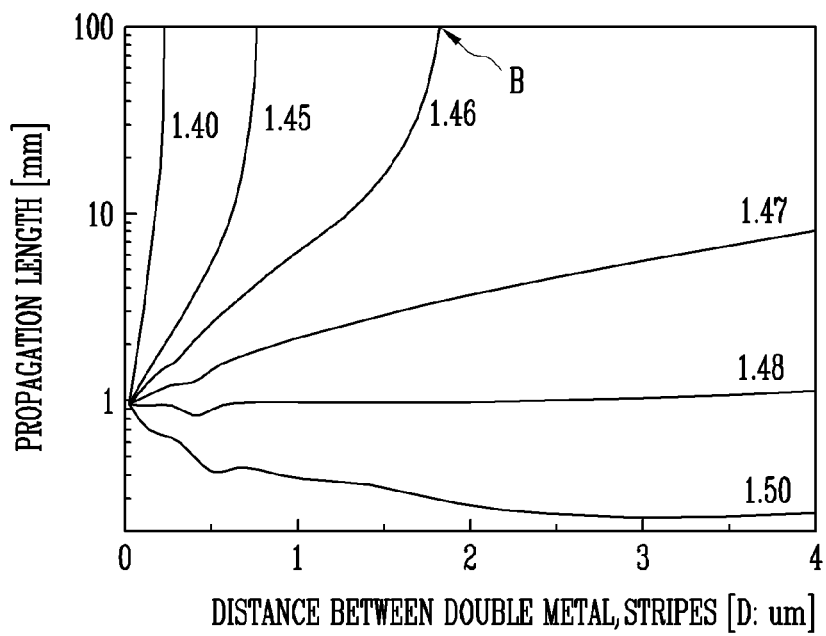
FIG. 5A is a graph showing the distribution curve of a propagation length according to a distance and a dielectric refractive index between double metal stripes of FIG. 4B.
Figure 5B:
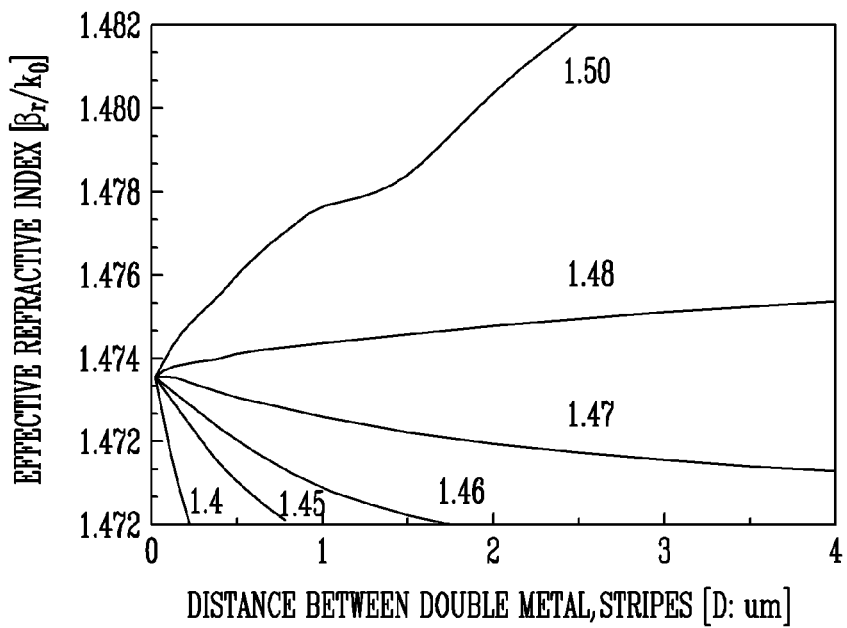
FIG. 5B is a graph showing the distribution curve of an effective refractive index according to a distance and a dielectric refractive index between double metal stripes of FIG. 4B.

FIGS. 5A and 5B are graphs showing the distribution curves of a propagation length and an effective refractive index according to a distance and a dielectric refractive index between the double metal stripes in the optical waveguide structure of FIG. 4B.

FIG. 5A shows the distribution of the super mode when the dielectric constant, i.e., the dielectric refractive index $n_2$, of the dielectric layer 201 between the double metal stripes 101 and 102 is 1.46, and the separation distance D is 1.7 μm. In this exemplary embodiment, the refractive index of the dielectric layer 201 between the double metal stripes is calculated when the dielectric constant $n_2$ of the dielectric layer 201 between the double metal stripes is 1.40, 1.45, 1.46, 1.47, 1.48 and 1.50, and a change according to the calculated refractive index is recognized. As can be seen in FIG. 5A, when the dielectric constant $n_2$ of the dielectric layer 201 (referred to as a second dielectric constant $n_2$) is larger than the dielectric constant $n_1$ of the dielectric around the metal stripes (referred to as a second dielectric constant $n_1$), the propagation length is reduced with the increase of the separation distance D. On the other hand, when the second dielectric constant $n_2$ is smaller than the first dielectric constant $n_1$, the propagation length increases non-linearly. In addition, when the second dielectric constant $n_2$ is smaller than the first dielectric constant $n_1$, and the separation distance D increases more than a predetermined distance, a mode does not exist. A cutoff distance beyond which a mode vanishes is 0.24 μm, 0.78 μm, and 1.84 μm when the second dielectric constant $n_2$ is 1.40, 1.45 and 1.46, respectively. Here, it can be seen that the cutoff distance decreases with the increase of a difference between the second dielectric constant $n_2$ and the first dielectric constant $n_1$. A propagation length at the separation distance D for cutoff is 420 mm, 230 mm, and 140 mm when the second dielectric constant $n_2$ is 1.40, 1.45 and 1.46, respectively. Here, it can be seen that the propagation length increases with the increase of the difference between the second dielectric constant $n_2$ and the first dielectric constant $n_1$. In addition, when the difference between the second dielectric constant $n_2$ and the first dielectric constant $n_1$ is large, the propagation length is remarkably changed with a small change in the separation distance D. For example, when the second dielectric constant $n_2$ is 1.40 and the separation distance D is 0.22 μm, the propagation length is 27 mm. However, when the separation distance D is 0.24 μm, the propagation length is 420 mm, which is more than 15 times that of when the separation distance D is 0.22 μm.

The reason why the propagation length increases when the second dielectric constant $n_2$ is smaller than the first dielectric constant $n_1$ can be derived from the variation characteristics of the effective refractive index shown in FIG. 5B. In FIG. 5B, when the second dielectric constant $n_2$ is smaller than the first dielectric constant $n_1$, the effective refractive index of the super mode approaches the dielectric constant, i.e., 1.47, of the dielectric around the metal stripes with the increase of the separation distance D. This is because the field of the super mode does not become 0 in the region of the second dielectric constant $n_2$ as the mode distribution shown in FIG. 5A and the amount of the field existing in the region of the second dielectric constant $n_2$ increases with the increase of the thickness of the region of the second dielectric constant $n_2$, thereby reducing the effective refractive index.

In FIG. 5B, when the effective refractive index of the mode becomes smaller than the first dielectric constant $n_1$, a section in which the leaky mode exists becomes very small, and the binding condition of the mode is not satisfied. The separation distance D at which the effective refractive index becomes the same as the first dielectric constant $n_1$ is 0.23 μm, 0.78 μm, and 1.78 μm and the propagation length is 240 mm, 230 mm, and 60 mm when the second dielectric constant $n_2$ is 1.40, 1.45 and 1.46, respectively. Therefore, the structure limiting the region of the second dielectric constant $n_2$ between the double metal stripes 101 and 102 as shown in FIG. 4B may be used in an optical device requiring long range propagation of light.

Figure 6:
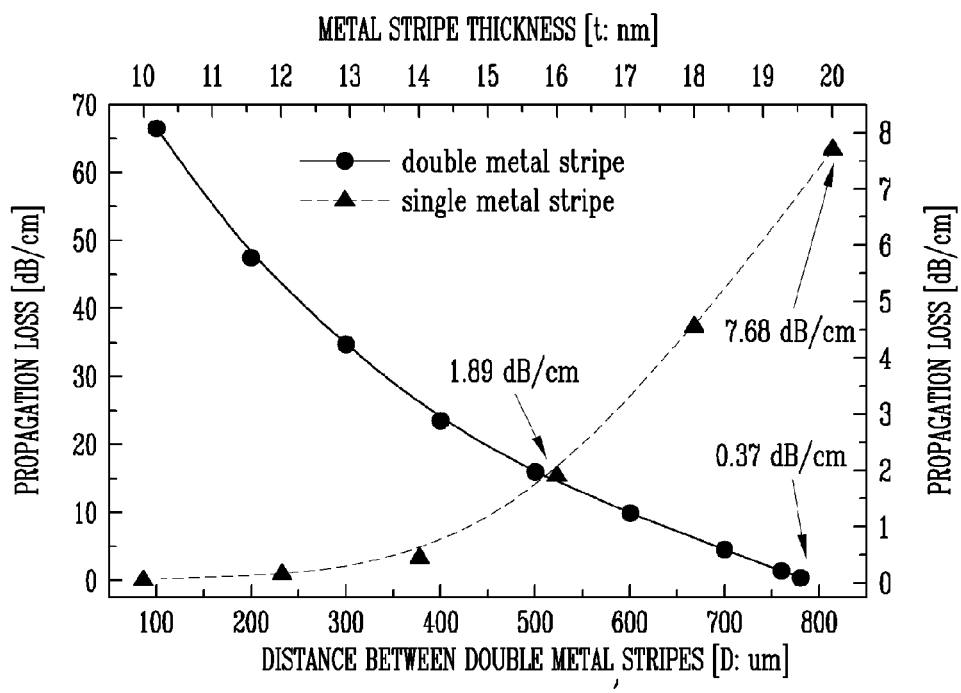
FIG. 6 is a graph showing propagation losses of a conventional metal waveguide composed of a single metal stripe and a metal waveguide having a stacked structure composed of double metal stripes according to the present invention.

FIG. 6 is a graph showing propagation losses of a conventional metal waveguide comprising a single metal stripe and a metal waveguide having a stacked structure comprising double metal stripes according to the present invention.

In FIG. 6, the dotted line denotes the propagation loss of the conventional metal waveguide (single metal stripe) according to the thickness of the metal stripe, and the solid line denotes the propagation loss of the metal waveguide (double metal stripe) suggested in the present invention calculated according to the distance between the double metal stripes. Among variables used in the calculation, the thickness of the metal stripes made of gold is 20 nm, the width is 5 μm, the first dielectric constant $n_1$ is 1.47 and the second dielectric constant $n_2$ is 1.45. In case of the stacked metal waveguide of the present invention, when the thickness of the metal stripes is 20 nm and the separation distance D is 780 nm, the propagation loss is 0.37 dB/cm. On the other hand, in case of the conventional metal waveguide, when the thickness of the metal stripe is 20 nm, the propagation loss is 7.68 dB/cm. In other words, although the metal waveguides have the same metal stripe thickness, the metal waveguide suggested by the present invention has a smaller propagation loss by a twentieth compared to that of the conventional metal waveguide.

The surface plasmon-based metal waveguide having a stacked structure of metal stripes suggested by the present invention may be implemented in various forms other than those suggested in FIGS. 2 and 4A.

Figure 7:
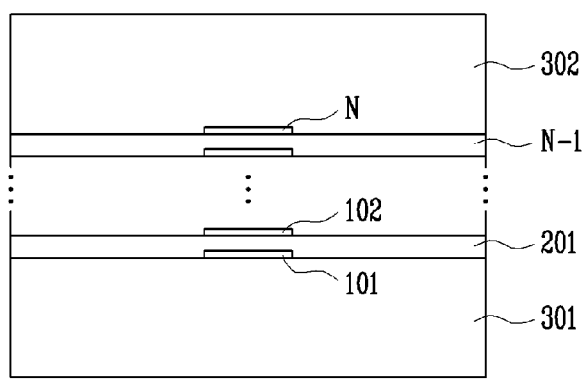
FIG. 7 is a cross-sectional view of a metal optical waveguide having a structure in which a dielectric layer and a metal stripe having a finite width are stacked in sequence according to an exemplary embodiment of the present invention.

FIG. 7 is a cross-sectional view of a metal optical waveguide having a structure in which a dielectric layer and a metal stripe having a finite width are stacked in sequence according to an exemplary embodiment of the present invention.

As illustrated in FIG. 7, the metal optical waveguide according to an exemplary embodiment of the present invention may have a structure in which a metal stripe 101, a dielectric layer 201 having a specific dielectric constant $n_2$, and a metal stripe 102 are sequentially stacked at least once, and thus N metal stripes and (N−1) dielectric layers are included, the metal stripes 101 and 102 having a finite width and being vertically aligned. Here, the N metal stripes and the (N−1) dielectric layers may be formed of different materials, respectively. In addition, the double metal stripes 101 and 102 are disposed adjacent to each other for the interaction of surface plasmons. Other dielectrics, i.e., clads 302 and 301, may be disposed adjacent to the uppermost and lowermost metal stripe of the metal optical waveguide, respectively.

Figure 8:
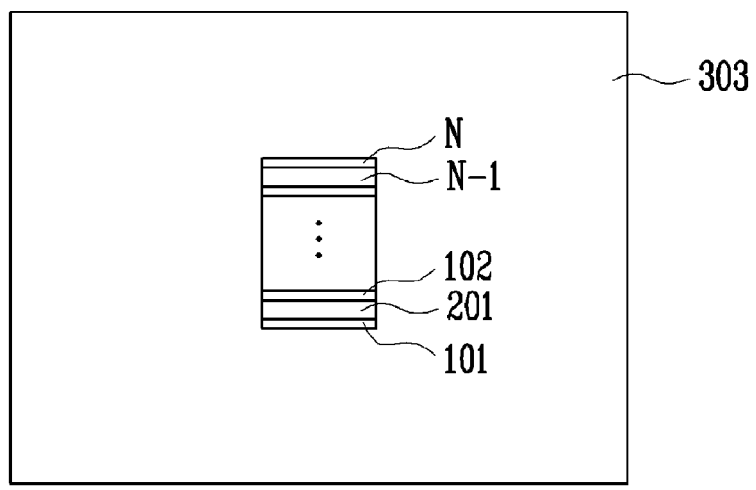
FIG. 8 is a cross-sectional view of a metal optical waveguide having a structure in which a dielectric layer having a finite width and a metal stripe having a finite width are stacked in sequence according to another exemplary embodiment of the present invention.

FIG. 8 is a cross-sectional view of a metal optical waveguide having a structure in which a dielectric layer having a finite width and a metal stripe having a finite width are stacked in sequence according to another exemplary embodiment of the present invention.

As illustrated in FIG. 8, the metal optical waveguide according to another exemplary embodiment of the present invention may have a structure in which a metal stripe 101 having a finite width, a dielectric layer 201 having a finite width, and a metal stripe 102 having a finite width are sequentially stacked at least once. Here, the double metal stripes 101 and 102 are disposed adjacent to each other for the interaction of surface plasmons. When the widths of the double metal stripes 101 and 102 are identical, the width of the dielectric layer 201 may be the same as those of the double metal stripes.

The metal stripe used in the optical waveguide device of the present invention may be formed of at least one of gold, silver, copper, aluminum, GaAs doped with n or p-type impurities, InP, and Silicon, or an alloy or a compound of the foregoing materials, or implemented by a multilayer structure in which combinations of the foregoing materials are stacked. The dielectric layer may be formed of at least one of glass, quartz, polymer, GaAs doped/undoped with n or p-type impurities, InP, and Silicon, or a compound of the foregoing materials, or implemented by a multilayer structure in which combinations of the foregoing materials are stacked. The clad layer may be formed of the same materials as the dielectric layer but must have a higher refractive index than the dielectric layer. The metal stripe may be formed of a material having a higher electric conductivity than the dielectric layer or the clad layer.

Figure 9:
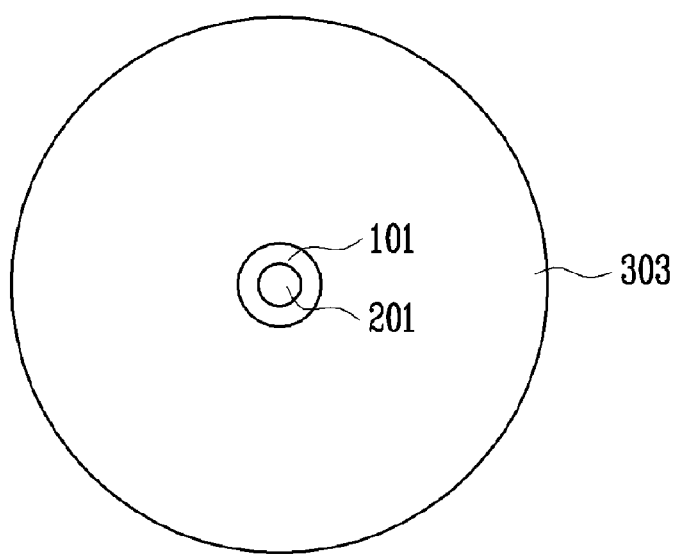
FIG. 9 is a cross-sectional view of a metal optical waveguide having a cylinder-shaped thin metal film structure according to yet another exemplary embodiment of the present invention.

FIG. 9 is a cross-sectional view of a metal optical waveguide having a cylinder-shaped thin metal film structure according to yet another exemplary embodiment of the present invention.

The metal optical waveguide of the present invention may be implemented by a cylinder-shaped metal waveguide having a modified structure for surface plasmons to have a combined mode by stacked layers. In this case, the diameter of the cylinder is set in consideration of the interaction of surface plasmons, and the refractive index of a material inside the cylinder is set to be lower than that of a material outside the cylinder. The cylinder, the inside of the cylinder, and the outside of the cylinder may be formed of a metal material, a material forming the dielectric layer mentioned above (when a structure having metal stripes stacked therein) is formed, and a clad material, respectively.

Figure 10:
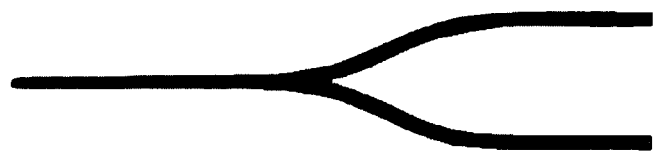
FIG. 10 shows a structure of a Y-branch.
Figure 11:
FIG. 11 shows a structure of a Mach-Zehnder interferometer.
Figure 12:
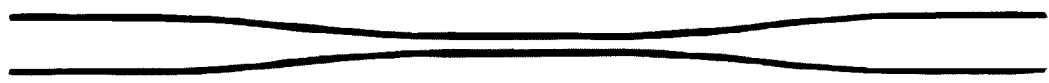
FIG. 12 shows a structure of a directional coupler.

In the above described exemplary embodiments of the present invention, a core may have the shape of a straight line, a curve, a taper, or a combination thereof and the structure of a Y-branch as shown in FIG. 10, a Mach-Zehnder interferometer as shown in FIG. 11 or a directional coupler as shown in FIG. 12. At least one of the second thin film and a clad may be formed of a liquefied material. At least one of the second thin film and the clad may be formed of a material having a thermo-optic effect, e.g., polymer, and then at least one of the first thin films may be used as a hot-wire. The second thin film may be formed of a material having an electro-optic effect, e.g., nonlinear polymer, and then the first thin films may be used as electrodes capable of applying an electric field to the second thin film.

As described above, according to the present invention, as a low-loss metal waveguide structure based on a surface plasmon, at least double metal stripes are stacked, and a dielectric layer having a lower refractive index than a clad layer is formed around the metal stripes. Therefore, field distribution is reduced in the metal stripes, so that propagation loss can be reduced. In addition, since the propagation loss of the present invention is smaller than a tenth of that of a conventional metal waveguide even when thin metal films of the present invention and the conventional metal waveguide have the same thickness, a low-loss metal waveguide can be realistically fabricated.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical waveguide device, comprising:
   a core having a stacked structure of 2N−1 layers including a plurality of first thin film layers and one or a plurality of second thin film layers, N being an integer equal to or greater than two, each layer alternately being one of the first thin film layers and one of the second thin film layer or layers, a lowermost layer being one of the first thin film layers, an uppermost layer being another one of the first thin film layers, whereby the core has N first thin film layers and N−1 second thin film layer or layers, each first thin film layer having a finite width and thickness and being formed of a first material having a relatively high electric conductivity, each second thin film layer being formed of a second material having a lower electric conductivity than the material forming the first thin film layers, two adjacent first thin film layers being disposed to provide interaction of surface plasmons; and
   a clad disposed around the core and formed of a material having a lower electric conductivity than the material forming the first thin film layers and a higher refractive index than the material forming the second thin film layer or layers, an entire bottom surface of the lowermost layer and an entire top surface of the uppermost layer being covered by the clad,
   wherein each first thin film layer has a width that is smaller than a width of the second thin film layers, such that each second thin film layer that covers a top surface of an adjacent first thin film layer entirely covers both side surfaces of the adjacent first thin film layer.

2. The optical waveguide device of claim 1, wherein each first thin film layer has a width of several nanometers to several hundreds of micrometers and a thickness of several nanometers to several hundreds of nanometers.

3. The optical waveguide device of claim 1, wherein each second thin film layer has a width of several nanometers to several hundreds of micrometers and a thickness of several nanometers to several tens of micrometers.

4. The optical waveguide device of claim 1, wherein each first thin film layer is formed of a material selected from the group of materials consisting of gold, silver, copper, aluminum, GaAs doped with n-type impurities or p-type impurities, InP, and silicon, a compound of the materials, and a multilayer structure in which combinations of the materials are stacked.

5. The optical waveguide device of claim 1, wherein each second thin film layer and the clad are formed of a material selected from the group of materials consisting of glass, quartz, polymer, GaAs doped with n-type impurities or p-type impurities, InP, and silicon, a compound of the materials, and a multilayer structure in which combinations of the materials are stacked.

6. The optical waveguide device of claim 1, wherein one of the clad and the second thin film layer or layers is a liquid.

7. The optical waveguide device of claim 1, wherein the core has a shape of at least one of a straight line, a curve and a taper.

8. The optical waveguide device of claim 1, wherein the core has a structure of a Y-branch, a Mach-Zehnder interferometer, or a directional coupler.

9. The optical waveguide device of claim 1, wherein each second thin film layer is formed of a material having an electro-optic effect, and each first thin film layer is used as an electrode capable of applying an electric field to the second thin film layer or layers.

10. The optical waveguide device of claim 1, wherein at least one of the clad and the second thin film layer or layers is formed of a material having a thermo-optic effect, and at least one of the first thin film layers is configured as a hot-wire.

11. An optical waveguide device, comprising:
    a core having a stacked structure of 2N−1 layers including a plurality of first thin film layers and one or a plurality of second thin film layers, N being an integer equal to or greater than two, each layer alternately being one of the first thin film layers and one of the second thin film layer or layers, a lowermost layer being one of the first thin film layers, an uppermost layer being another one of the first thin film layers, whereby the core has N first thin film layers and N−1 second thin film layer or layers, each first thin film layer having a finite width and thickness and being formed of a first material having a relatively high electric conductivity, each second thin film layer being formed of a second material having a lower electric conductivity than the material forming the first thin film layers, two adjacent first thin film layers being disposed to provide interaction of surface plasmons; and a clad disposed around the core and formed of a material having a lower electric conductivity than the material forming the first thin film layers and a higher refractive index than the material forming the second thin film layer or layers, an entire bottom surface of the lowermost layer and an entire top surface of the uppermost layer being covered by the clad, wherein each first thin film layer has a width that is same as a width of the second thin film layers and smaller than a width of the clad, such that both side surfaces of each first thin film layer are entirely covered by the clad and both side surfaces of each second thin film layer are entirely covered by the clad.

12. The optical waveguide device of claim 11, wherein each first thin film layer has a width of several nanometers to several hundreds of micrometers and a thickness of several nanometers to several hundreds of nanometers.

13. The optical waveguide device of claim 11, wherein each second thin film layer has a width of several nanometers to several hundreds of micrometers and a thickness of several nanometers to several tens of micrometers.

14. The optical waveguide device of claim 11, wherein each first thin film layer is formed of a material selected from the group of materials consisting of gold, silver, copper, aluminum, GaAs doped with n-type impurities or p-type impurities, InP, and silicon, a compound of the materials, and a multilayer structure in which combinations of the materials are stacked.

15. The optical waveguide device of claim 11, wherein each second thin film layer and the clad are formed of a material selected from the group of materials consisting of glass, quartz, polymer, GaAs doped with n-type impurities or p-type impurities, InP, and silicon, a compound of the materials, and a multilayer structure in which combinations of the materials are stacked.

16. The optical waveguide device of claim 11, wherein one of the clad and the second thin film layer or layers is a liquid.

17. The optical waveguide device of claim 11, wherein the core has a shape of at least one of a straight line, a curve and a taper.

18. The optical waveguide device of claim 11, wherein the core has a structure of a Y-branch, a Mach-Zehnder interferometer, or a directional coupler.

19. The optical waveguide device of claim 11, wherein each second thin film layer is formed of a material having an electro-optic effect, and each first thin film layer is used as an electrode capable of applying an electric field to the second thin film layer or layers.

20. The optical waveguide device of claim 11, wherein at least one of the clad and the second thin film layer or layers is formed of a material having a thermo-optic effect, and at least one of the first thin film layers is configured as a hot-wire.

* * * * *